(12) United States Patent
Li et al.

(10) Patent No.: US 10,148,747 B2
(45) Date of Patent: Dec. 4, 2018

(54) ALLOCATION OF TRANSMISSION ATTEMPTS

(71) Applicant: Nokia Solutions and Networks Oy, Espoo (FI)

(72) Inventors: Zexian Li, Espoo (FI); Hamidreza Shariatmadari, Espoo (FI); Mikko Aleksi Uusitalo, Helsinki (FI); Sassan Iraji, Espoo (FI)

(73) Assignee: Nokia Solutions and Networks Oy, Espoo (FI)

(*) Notice: Subject to any disclaimer, the term of this patent is extended or adjusted under 35 U.S.C. 154(b) by 235 days.

(21) Appl. No.: 14/978,454

(22) Filed: Dec. 22, 2015

(65) Prior Publication Data

US 2017/0180466 A1    Jun. 22, 2017

(51) Int. Cl.
*H04L 29/08* (2006.01)
*H04W 72/04* (2009.01)
(Continued)

(52) U.S. Cl.
CPC .............. *H04L 67/104* (2013.01); *H04L 1/18* (2013.01); *H04W 72/042* (2013.01); *H04W 72/0413* (2013.01); *H04W 72/1226* (2013.01); *H04W 76/14* (2018.02); *H04W 88/02* (2013.01); *H04W 88/08* (2013.01)

(58) Field of Classification Search
CPC .............. H04L 67/104; H04L 25/0278; H04L 25/0298; H04W 72/042; H04W 72/0413; H04W 88/02; H04W 88/08; H04W 84/18
See application file for complete search history.

(56) References Cited

U.S. PATENT DOCUMENTS

2007/0293218 A1* 12/2007 Meylan ............. H04W 74/0816
455/434
2013/0324114 A1   12/2013 Raghothaman et al.
2016/0381539 A1   12/2016 Park et al.

FOREIGN PATENT DOCUMENTS

WO    WO 2014180518 A1   11/2014
WO    WO 2015147376 A1   10/2015

OTHER PUBLICATIONS

3GPP TS 23.203 V12.6.0 (Sep. 2014); 3rd Generation Partnership Project; Technical Specification Group Services and System Aspects; Policy and charging control architecture (Release 12).
(Continued)

*Primary Examiner* — Chandrahas B Patel
(74) *Attorney, Agent, or Firm* — Harrington & Smith

(57) ABSTRACT

For a communication between two UEs that passes through a network node, a total number of transmission attempts for a same set of data is divided between first and second data transmission attempt(s). The first data transmission attempt(s) are allowed to be performed from a first one of the two UEs toward the network node. The second data transmission attempt(s) are allowed to be performed from the network node or from a second network node toward a second one of the two UEs. Performance of the first and second data transmission attempt(s) is coordinated based on the division to cause communication of the set of data from the first UE to the second UE. A single network node may perform the first and second data transmission attempts, or a first network node performs the first data transmission attempts while a second network node performs the second data transmission attempts.

20 Claims, 11 Drawing Sheets

(51) Int. Cl.
  *H04W 72/12* (2009.01)
  *H04L 1/18* (2006.01)
  *H04W 88/08* (2009.01)
  *H04W 76/14* (2018.01)
  *H04W 88/02* (2009.01)

(56) References Cited

OTHER PUBLICATIONS

Hamidreza Shariatmadari, et al.; "Analysis of Transmission Methods for Ultra-Reliable Communications"; 2015 IEEE 26$^{th}$ International Symposium on Personal, Indoor and Mobile Radio Communications (PIMRC)—Workshop on M2M Communications: Challenges, Solutions and Applications; pp. 2303-2308.

* cited by examiner

ALLOCATION OF TRANSMISSION ATTEMPTS

TECHNICAL FIELD

This invention relates generally to wireless communications and, more specifically, relates to allocation of transmission attempts of the same data in peer-to-peer communications.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

One set of requirements which will be introduced in the future wireless communication systems is to support ultra-reliable communications (URC) and low-latency communications. These requirements are much more stringent compared to those in the current systems such as 4G LTE systems. URC is required to enable new emerging applications such as traffic safety, especially for scenarios with autonomous driving, industrial automation, and e-health service for example.

For example, some road safety applications require that the information packets are delivered successfully with very high probability and within a certain period of the time. Another example is industry automation, where reliability and latency are the most important criteria for system designs. The failure to comply with these requirements can have serious implications for the well-being of the users relying on the road safety service or serious damage in case of industry automation.

BRIEF SUMMARY

This section is intended to include examples and is not intended to be limiting.

A method comprises: for a communication between two user equipments that passes through a network node, dividing by the network node a total number of transmission attempts for a same set of data of the communication between one or more first data transmission attempts and one or more second data transmission attempts, wherein the one or more first data transmission attempts are allowed to be performed from a first one of the two user equipments toward the network node, and wherein the one or more second data transmission attempts are allowed to be performed from the network node or from a second network node toward a second one of the two user equipments; and coordinating performance of the first and second data transmission attempts for the communication based on the division to cause communication of the set of data from the first user equipment to the second user equipment.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: for a communication between two user equipments that passes through a network node, dividing by the network node a total number of transmission attempts for a same set of data of the communication between one or more first data transmission attempts and one or more second data transmission attempts, wherein the one or more first data transmission attempts are allowed to be performed from a first one of the two user equipments toward the network node, and wherein the one or more second data transmission attempts are allowed to be performed from the network node or from a second network node toward a second one of the two user equipments; and coordinating performance of the first and second data transmission attempts for the communication based on the division to cause communication of the set of data from the first user equipment to the second user equipment.

An exemplary computer program product includes a computer-readable storage medium bearing computer program code embodied therein for use with a computer. The computer program code includes: code, for a communication between two user equipments that passes through a network node, for dividing by the network node a total number of transmission attempts for a same set of data of the communication between one or more first data transmission attempts and one or more second data transmission attempts, wherein the one or more first data transmission attempts are allowed to be performed from a first one of the two user equipments toward the network node, and wherein the one or more second data transmission attempts are allowed to be performed from the network node or from a second network node toward a second one of the two user equipments; and code for coordinating performance of the first and second data transmission attempts for the communication based on the division to cause communication of the set of data from the first user equipment to the second user equipment.

Another example is a method comprising: receiving information from a first network node at a second network node, the received information corresponding to a communication between two user equipments that passes from a first of the two user equipments to the first network node via one or more first data transmission attempts, then to the second network node, and from the second network node to the second of the two user equipments via one or more second data transmission attempts, wherein a total number of transmission attempts for a same set of data is divided between the one or more first data transmission attempts and the one or more second data transmission attempts, and wherein the receiving also comprises receiving the set of data; and performing by the second network node the one or more second data transmission attempts of the set of data from the second network node to the second user equipment based at least on the information.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: receiving information from a first network node at a second network node, the received information corresponding to a communication between two user equipments that passes from a first of the two user equipments to the first network node via one or more first data transmission attempts, then to the second network node, and from the second network node to the second of the two user equipments via one or more second data transmission attempts, wherein a total number of transmission attempts for a same set of data is divided between the one or more first data transmission attempts and the one or more second data transmission attempts, and wherein the receiving also comprises receiving the set of data; and performing by the second network node the one or more second data transmission attempts of the set of data from the second network node to the second user equipment based at least on the information.

An exemplary computer program product includes a computer-readable storage medium bearing computer program code embodied therein for use with a computer. The computer program code includes: code for receiving information from a first network node at a second network node, the received information corresponding to a communication between two user equipments that passes from a first of the two user equipments to the first network node via one or more first data transmission attempts, then to the second network node, and from the second network node to the second of the two user equipments via one or more second data transmission attempts, wherein a total number of transmission attempts for a same set of data is divided between the one or more first data transmission attempts and the one or more second data transmission attempts, and wherein the receiving also comprises receiving the set of data; and code for performing by the second network node the one or more second data transmission attempts of the set of data from the second network node to the second user equipment based at least on the information.

BRIEF DESCRIPTION OF THE DRAWINGS

In the attached Drawing Figures:

FIG. 3(a) is for M=4 and $\varepsilon=10^{-5}$, FIG. 3(b) is for M=5 and $\varepsilon=10^{-5}$, FIG. 3(c) is for M=4 and $\varepsilon=10^{-10}$, and FIG. 3(d) is for M=5 and $\varepsilon=10^{-10}$;

FIG. 4(a) is for M=4 and $\varepsilon=10^{-5}$, FIG. 4(b) is for M=5 and $\varepsilon=10^{-5}$, FIG. 4(c) is for M=4 and $\varepsilon=10^{-10}$, and FIG. 4(d) is for M=5 and $\varepsilon=10^{-10}$;

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Examples of the embodiments herein describe techniques for fixed and adaptive allocation of transmission attempts for ultra-reliable communications. Additional description of these techniques is presented after systems into which the examples of embodiments may be used are described.

Figure 1A:
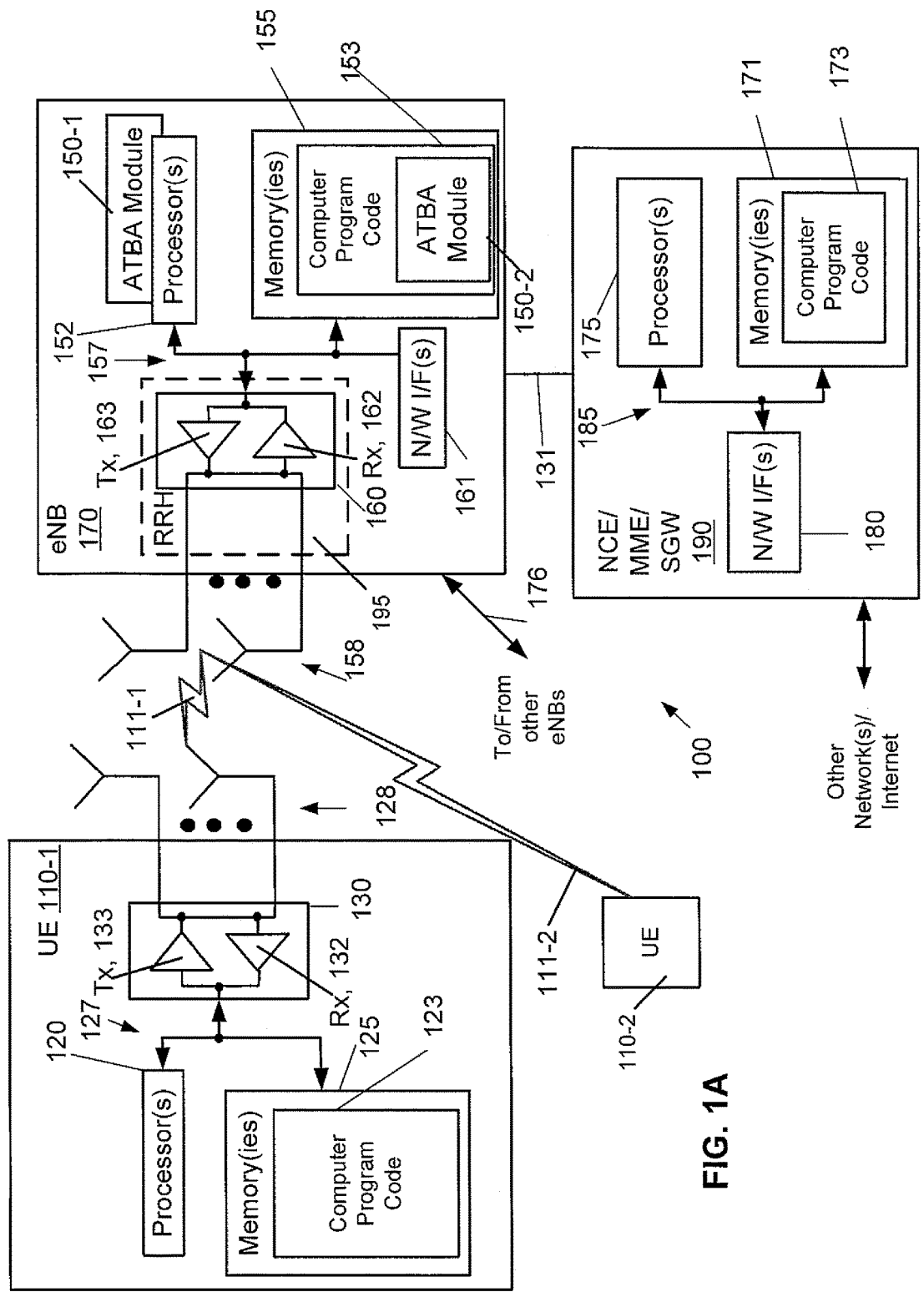
FIG. 1A is a block diagram of one possible and non-limiting example of a system in which one or more of the embodiments may be practiced.

Turning to FIG. 1A, this figure shows a block diagram of one possible and non-limiting example of a system in which one or more of the embodiments may be practiced. In FIG. 1A, user equipment (UEs) 110-1 and 110-2 are in wireless communication with a wireless network 100. A UE 110 is a wireless, typically mobile device that can access a wireless network. The UEs 110-1 and 110-2 are assumed to be similar, so only one possible implementation of UE 110-1 will be described herein. The UE 110-1 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The one or more memories 125 and the computer program code 123 may be configured to, with the one or more processors 120, cause the user equipment 110 to perform one or more of the operations as described herein. The UEs 110-1 and 110-2 communicates with eNB 170 via wireless links 111-1 and 111-2, respectively.

The eNB (evolved NodeB) 170 is a network node called a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes an Adaptive Time Allocation (ATBA) module 150, comprising one of or both parts 150-1 and/or 150-2, which may be implemented in a number of ways. The ATBA module 150 may be implemented in hardware as ATBA module 150-1, such as being implemented as part of the one or more processors 152. The ATBA module 150-1 may be implemented also as an integrated circuit or through other hardware such as a programmable gate array. In another example, the ATBA module 150 may be implemented as ATBA module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

Figure 1B:
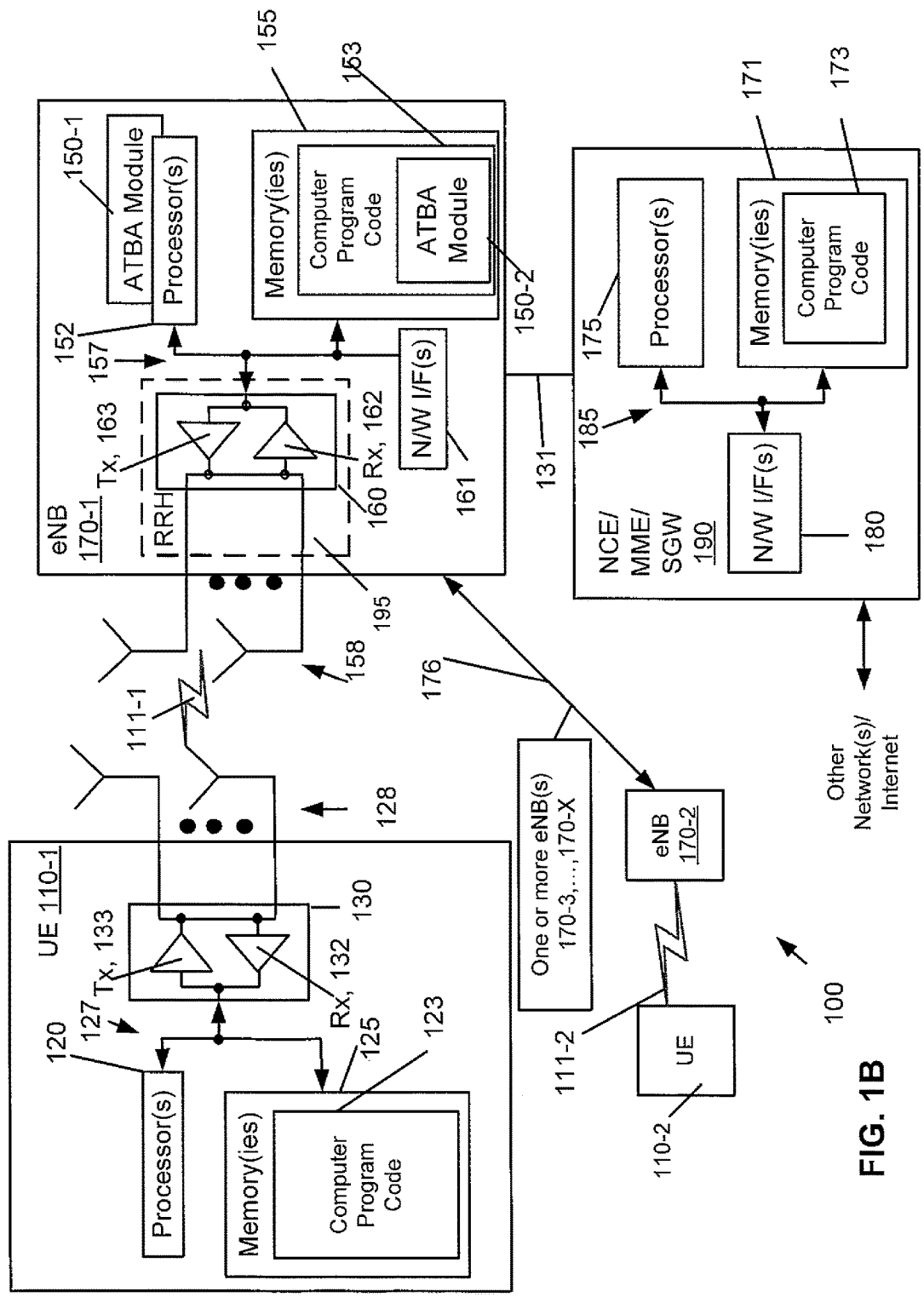
FIG. 1B is a block diagram of another possible and non-limiting example of a system in which one or more of the embodiments may be practiced.

In FIG. 1A, the eNB 170 acts as an intermediary between the two UEs 110 to support peer-to-peer communications between the UEs 110. That is, information that flows between the two UEs 110 flows through the eNB 170. This is a "single hop" scenario. FIG. 1B illustrates another example, where the two UEs 110 perform peer-to-peer communications between the UEs 110 via multiple eNBs 170. This is an example of a "multi-hop" scenario. In this example, the UE 110-1 communicates via link 111-1 with the eNB 170-1, which then communicates with eNB 170-2. The eNB 170-2 communicates with UE 110-2 via link 111-2. The two eNBs 170-1 and 170-2 act as intermediaries in this case. In one example, there are no other hops between eNBs 170-1 and 170-2. In another example, there could be one or more hops between eNBs 170-1 and 170-2, as illustrated by one or more other eNBs 170-3, . . . , 170-X.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

As stated above, in the fixed transmission allocation of conventional systems, the number of transmission attempts for uplink and downlink is determined purely based on the link quality. Improvements could be made in this area. This description begins with more detail on conventional techniques, and then presents detail on new techniques for improving this area.

In terms of transmission policies, current LTE systems define a Quality of Service (QoS) class to offer different reliability and latency levels. See, e.g., Table 6.1.7 of 3GPP TS 23.203 V12.6.0 (2014-09). The offered BLER ranges from $10^{-6}$ to $10^{-2}$ with delay budget from 50 ins to 300 ms. Generally speaking, the higher reliability is achieved with higher delay. The QoS class is a means to serve various applications according to their requirements. This class can be utilized to determine the proper number of HARQ rounds for payload transmissions.

LTE also provides a set of modulation and coding schemes (MCS) for data transmissions to perform link adaptation. The link adaptation is performed by choosing the proper MCS according to the link quality, which is determined by estimating the SINR at the receiver. The selected MCS should perform with a targeted BLER level less than 10%.

The mentioned QoS class and link adaptation scheme might not meet the stringent reliability and delay constraints for envisioned applications requiring URC for their operation.

In more detail, URC has stringent requirements for reliability and latency. The end-to-end delay constraint limits the number of transmission attempts for each payload transmission. According to the proposed 5G frame structure in one concept, the payload should be delivered within less than five subframes to meet the 1 ms latency requirement. This means that the target reliability should be achieved with a very limited number of transmission attempts. The current wireless systems are not capable of supporting ultra-reliability and low-latency at the same time. For instance, LTE improves the reliability by allowing a maximum of four HARQ rounds. On the other hand, when the retransmission is limited to one for time critical applications, the BLER worsens, possibly down to 1%. Hence, advanced transmission policies and resource allocation schemes are required. In some embodiments herein, we propose fixed and adaptive resource (according to transmission attempts as well) allocation schemes for uplink and downlink in peer-to-peer communications. In some embodiments, in a proposed adaptive transmission allocation, the number of transmission attempts can be dynamically changed during data transmission.

Taking into account the requirements for reliability and latency, in some embodiments, a resource allocation scheme efficiently divide the transmission attempts (i.e., the total number of transmissions for the same data packet) for uplink and downlink data transmissions, for example, to improve the overall resource utilization in a peer-to-peer communication. That is different than in conventional wireless systems, where the transmission attempts are independently determined for uplink and downlink. For instance, for VoIP applications, where a voice packet usually carries 20 ms worth of speech, the maximum number of retransmissions is about two, given that HARQ delay is in the order of 10 ms. In contrast, in some embodiments, the resource allocation scheme allows dividing the transmission attempts based on the link qualities and in an adaptive manner. Assume, for instance, that a reliable communication is required between two devices (e.g., UE 110-1 and UE 110-2) passing their data through a base station (e.g., eNB 170, as in FIG. 1A). If the quality of link 111-1 (e.g., from UE 110-1 and eNB 170 of FIG. 1A) is good and link 111-2 (from eNB 170 to UE 110-2 of FIG. 1A) is bad, we can expect that the data is delivered successfully over link 111-1 with the initial transmission attempt and the retransmission does not help much for this link. In this situation, we can force the link 111-1 not to use the retransmission attempt, and allow the link 111-2 to utilize one extra retransmission attempt for sending or receiving data.

In some embodiments, the allocated transmission attempts for the downlink (e.g., from eNB 170 to UE 110-2 in FIG. 1A) are changed according to the successful reception of uplink. In this way, the number of transmission attempts for the uplink and downlink are not determined independently and in advance, but instead are adaptively adjusted according to the success or failure of transmission in uplink.

Our analysis results suggest that up to 25% spectral efficiency can be achieved for an ARQ scheme using the LTE physical framework. Proposed schemes can also be applied for multi-hop links (such as that shown in FIG. 1B, where data goes through two eNBs 170) to determine the maximum transmission attempts for each hop.

Figure 2A:
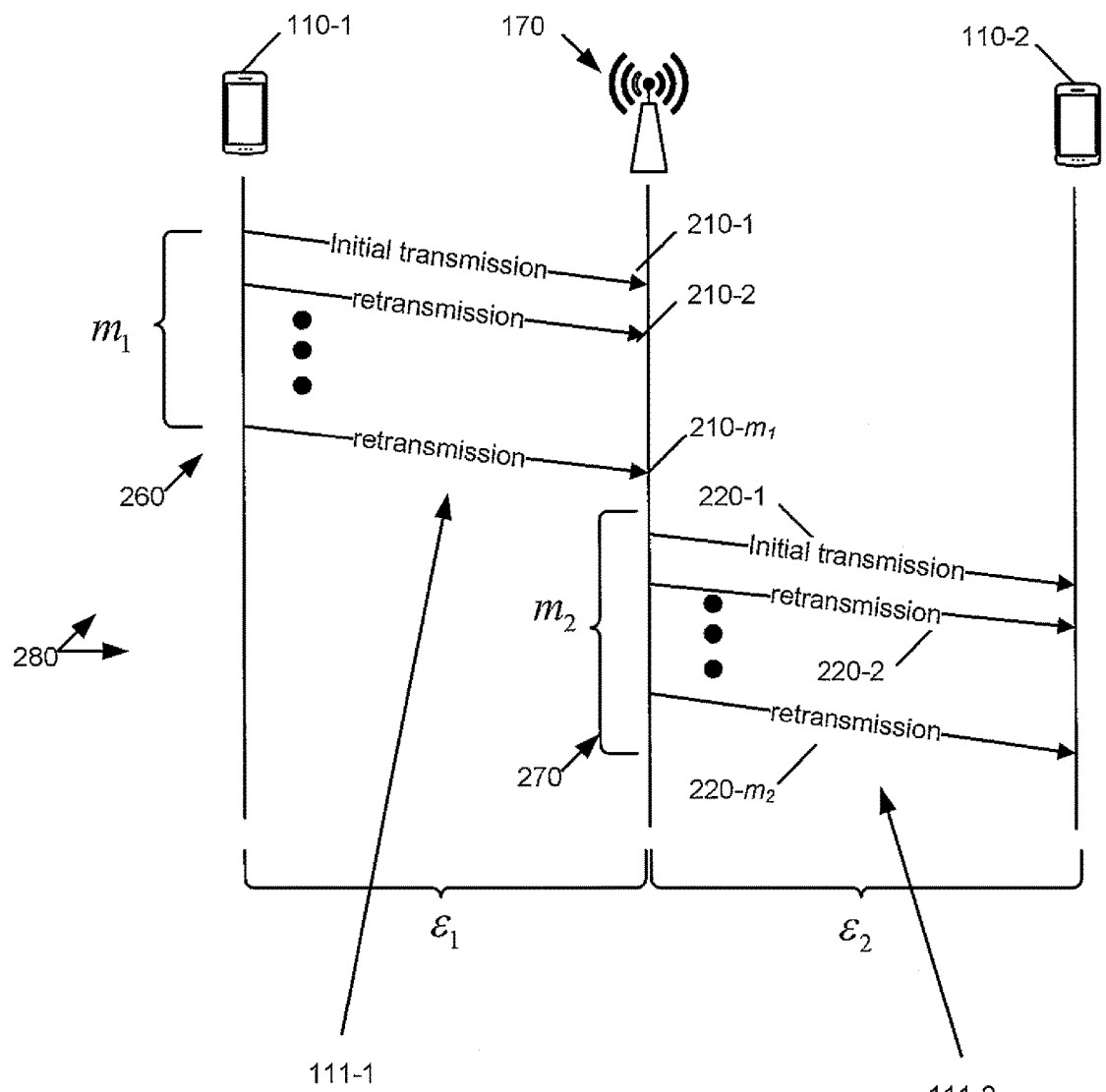
FIG. 2A is an example of a considered system model in some embodiments.

Consider now an example scenario in which a reliable communication with low-latency is used for delivering data from device 1 (UE 110-1) to device 2 (UE 110-2) via a base station (eNB 170). The considered scenario is depicted in FIG. 2A. It is assumed that the latency requirement limits the total number of transmission attempts in both links (uplink and downlink). The maximum total number of transmission attempts is represented by M, the number of transmission attempts for uplink by $m_1$ (including an initial transmission 210-1 and possibly one or more retransmissions 210-2 through 210-$m_1$ in an uplink part 260 of the P2P transmission 280), and the number of transmission attempts for link 111-2 by $m_2$ (including an initial transmission 220-1 and possibly one or more retransmissions 220-2 through 220-$m_2$ in a downlink part 270 of the P2P transmission 280). The latency constraint entails the following:

$$m_1+m_2 \leq M. \quad (1)$$

It is noted that M is determined by end-to-end latency requirement. For example, if maximum end-to-end latency is 10 ms, if one transmission in one direction (either UL and DL) takes 2 ms, then the total number of transmission attempts is M=5. It is also assumed that the required end-to-end reliability is associated with BLER of $\epsilon$ as one example. The remaining BLER after retransmissions over the link 111-1 is $\epsilon_1$, and over the link 111-2 is $\epsilon_2$. The reliability constraint entails the following:

$$1-(1-\epsilon_1)(1-\epsilon_2) \leq \epsilon. \quad (2)$$

The link adaptation design and resource allocation scheme entail satisfying equations (1) and (2). In the following, two different schemes are proposed to efficiently divide transmission attempts between link 111-1 and link 111-2. One scheme is a fixed transmission allocation scheme, which is described in relation to the non-limiting examples in FIGS. 2B, 3, and 6. A second scheme is an adaptive resource allocation scheme, described in relation to the non-limiting examples in FIGS. 4 and 7.

Figure 2B:
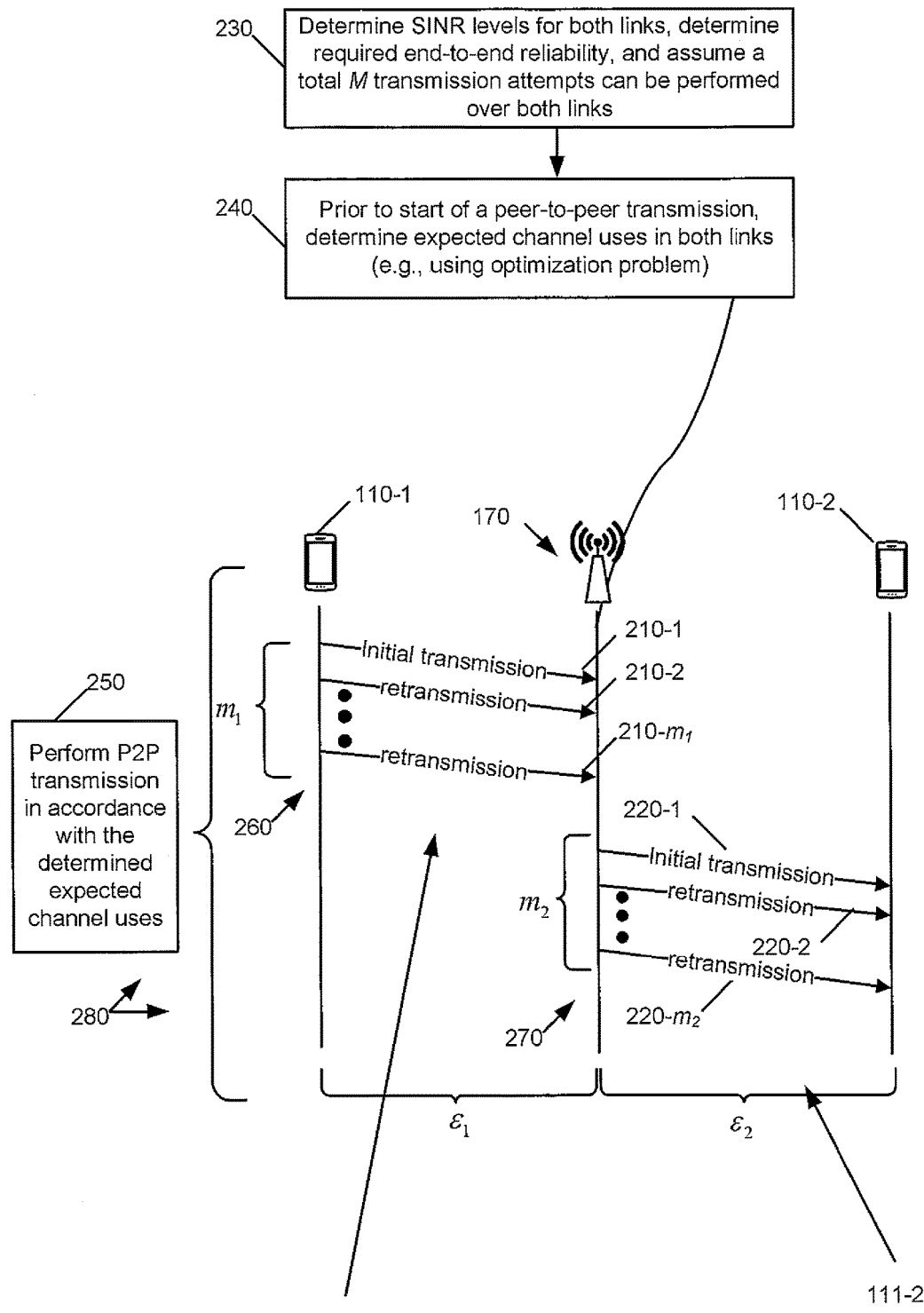
FIG. 2B is the example of FIG. 2A for performing fixed resource allocation in an example.

Fixed transmission allocation is now described. In some embodiments, it is assumed that the number of transmission attempts should be chosen for each link independently and cannot be changed during data transmissions. In some embodiments, choosing the number of transmission attempts independently means UL and DL will choose MCS level independently. And also the number of transmission attempts for UL or DL may be also set independently. For example, the number of DL transmission attempts is determined only based on, e.g., DL CQI before getting UL reception at base station. Turning to FIG. 2B, this figure is the example of FIG. 2A for performing fixed resource allocation in an example. In block 230, the eNB 170 estimates quality (e.g. SINR levels) for both links 111-1 and 111-2 (e.g., via techniques known in this area), determines required end-to-end reliability (e.g., such as via the BLER), and assumes a total M transmission attempts can be performed over both links 111. In block 240, the eNB 170 determines, prior to the start of a peer-to-peer transmission, expected channel uses in both links. In this example, the transmissions and retransmissions 210 and 220 form part of block 250, where the peer-to-peer (P2P) transmission is performed in accordance with the determined expected channel uses.

As an example of an implementation of FIG. 2B, taking M=6 transmission/retransmissions as one example, the allocation is two for UL (e.g., from UE 110-1 to eNB 170) and four for DL (e.g., from eNB 170 to UE 110-2). In case the UL only needs one transmission attempt out of the two allocated to the UL, the leftover time budget of one transmission attempt will not be allocated to DL in this example. Maybe the resource(s) originally allocated for UL can be allocated for other usage. On the other hand, in case the UL needs more than two transmissions, there will be a problem with latency since the UE 110-1 might need to get new resource for an additional UL transmission. The resource optimization is derived considering the target reliability. So, with high probability, the allocated resource would be enough for uplink and downlink. However, for this example, if data transmission is not successful in uplink with two transmissions, the data might be dropped. Note that while depending on the traffic type and related requirements, if there is still time, the UE can perform retransmission with a new resource as well. This problem may be mitigated using the adaptive transmission scheme described below.

In some embodiments, the eNB 170 coordinates and schedules the transmissions and retransmissions 210, 220. Note that blocks 230, 240, and 250, and the steps herein may also illustrate the operation of an example of a method, a result of execution of computer program instructions embodied on a computer readable memory, functions performed by logic implemented in hardware, and/or interconnected means for performing functions in accordance with some embodiments. Also, the eNB 170 would perform the steps in FIG. 2B under control in part by its corresponding ATBA module 150.

How to determine the expected channel uses is now described, and this example uses an optimization problem described below (although other techniques and optimization problems may be used). We consider finite-block length analysis, in an example, that provides the lowest required resources (e.g., PRB-type of resources) on both uplink and downlink to achieve a certain reliability. See H. Shariatmadari, S. Iraji, R. Jäntti, "Analysis of Transmission Methods for Ultra-Reliable Communications", Proc. IEEE PIMRC—Workshop on M2M Communications: Challenges, Solutions and Applications, pp. 1126-1131, 2015. Assume that k bits of information are carried over an AWGN channel using n channel uses with SINR of y. The expected BLER can be expressed as:

$$E(n, k, \gamma) = Q\left(\frac{nC_1(\gamma) - k}{\sqrt{nV_1(\gamma)}}\right), \quad (3)$$

where:

$$C_1(\gamma) = \frac{1}{2}\log(\gamma),$$

and $$V_1(\gamma) = \frac{\gamma}{2}\frac{\gamma+2}{(\gamma+1)^2}\log^2 e.$$

Note that $\log^2 e = (\log e)^2$ and $$Q(x) = \frac{1}{\sqrt{2\pi}}\int_x^\infty \exp\left(-\frac{u^2}{2}\right)du.$$

First, we focus in this example on a single link 111 and use of an ARQ scheme. If for link i with SINR of $y_i$, the transmitter carries the k bits of information using $n_i$ channel uses (e.g., the number of used resource blocks), and the transmission attempts are limited to $m_i$ rounds, the expected channel uses can be expressed as the following:

$$\overline{N}_i(n_i, m_i, k, y_i) = \Sigma_{j=1}^{m_i} n_i \{E(n_i, k, y_i)\}^{j-1}. \quad (4)$$

Now we consider both links 111, employing an ARQ scheme. We assume that the base station is aware of SINR levels for both links and in total M transmission attempts can be performed over both links. In order to minimize the expected channel uses in both links 111-1 and 111-2, we consider the following optimization problem:

$$\operatorname{argmin}_{n_1, n_2, m_1} \overline{N}_1(n_1, m_1, k, y_1) + \overline{N}_2(n_2, M - m_1, k, y_2),$$

Subject to:

$$1 - \{1 - \{E(n_1, k, y_1)\}^{m_1}\}\{1 - \{E(n_2, k, y_2)\}^{M-m_1}\} \le \epsilon. \quad (5)$$

Figure 3:
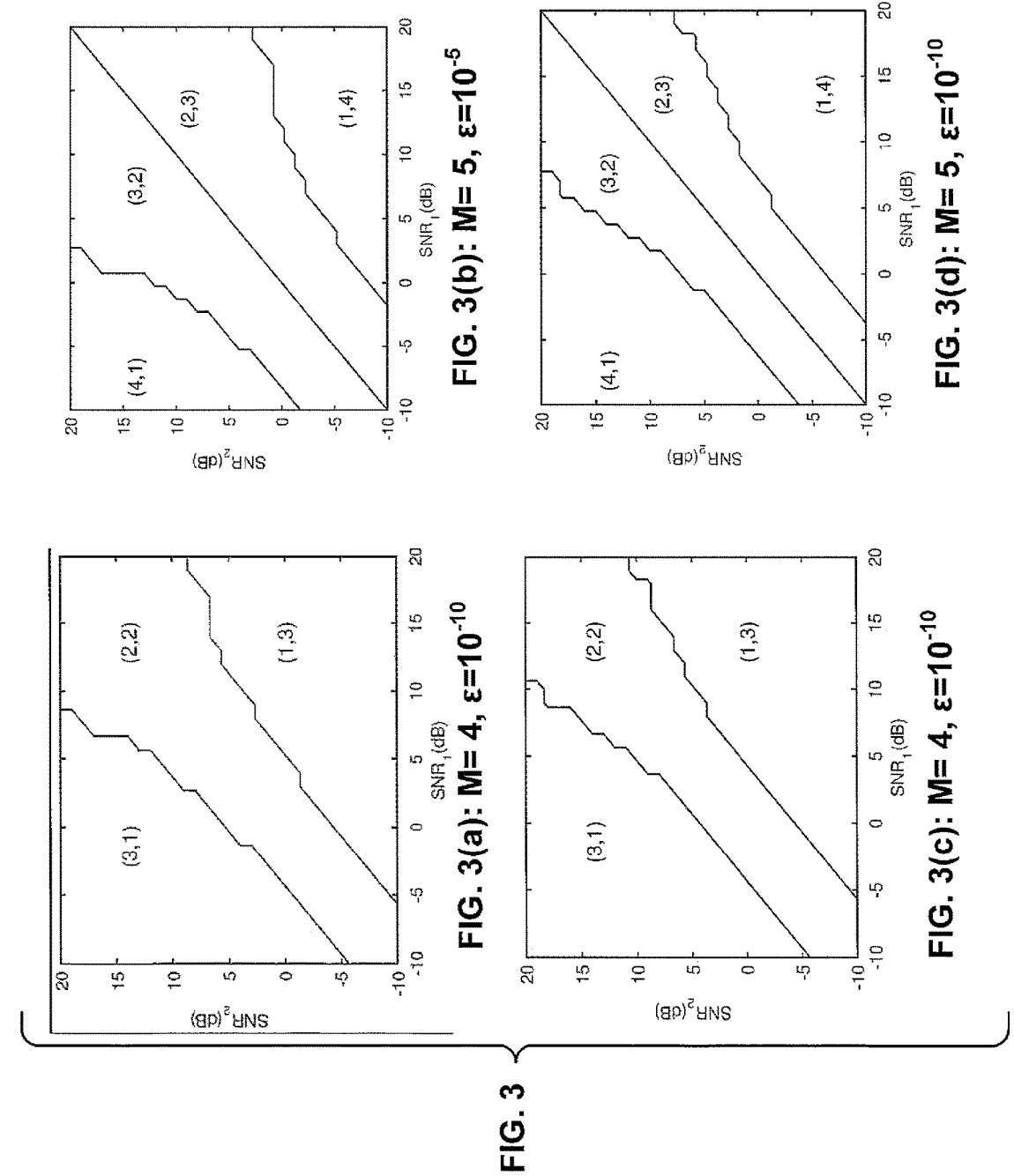
FIG. 3, including FIGS. 3(a), 3(b), 3(c), and 3(d), includes graphs illustrating optimal distribution of transmission attempts for ARQ (k=100), where

FIG. 3 represents an optimal transmission allocation for two links based on their link qualities, achieved from the optimization problem. FIG. 3 includes FIGS. 3(a), 3(b), 3(c), and 3(d), which are graphs illustrating optimal distribution of transmission attempts for ARQ (k=100), where FIG. 3(a) is for M=4 and $\epsilon=10^{-5}$, FIG. 3(b) is for M=5 and $\epsilon=10^{-5}$, FIG. 3(c) is for M=4 and $\epsilon=10^{-10}$, and FIG. 3(d) is for M=5 and $\epsilon=10^{-10}$. When the SINR levels for both links are approximately the same, the number of transmission can be equally divided between two links as expected. However, when the difference between SINR levels increases, more transmission attempts are allocated for link 111 having poor quality. The figure also suggests that the higher required reliability forces one to divide transmission attempts unequally at lower SINR level differences. The notation (3,1) in FIG. 3(a) (with similar notation used in both FIGS. 3 and 5) indicates how many transmission attempts for link 1 and link 2, respectively, were made. In case the $SNR_1$ is worst, three (3) transmission attempts are allocated to link 1 and one (1) transmission attempt is allocated to link 2. The curves are just "area boundary" indications between the (3,1), (2,2), and (1,3) transmission attempts for link 1 and link 2. $SNR_1$ means the SNR level for link 1 and similarly $SNR_2$ for link 2. This method can be extended for an incremental redundancy HARQ scheme. In some embodiments, the encoded data can be delivered to the receiver incrementally. Assume that for the link i, with the maximum of $m_i$ transmission attempts, data is incrementally transmitted using $\vec{n}_i = \{n_{i,1}, n_{i,2}, \ldots, n_{i,m_i}\}$ channel uses, which $n_{i,j}$ represents the channel uses in the jth HARQ round for link i. The expected channel uses in this link can be expressed as:

$$\overline{N}_i(\vec{n}_i, m_i, k, y_i) = \sum_{j=1}^{m_i-1} n_{i,j} \{E(\sum_{k=1}^{j-1} n_{i,k}, k, y_i)\}. \qquad (6)$$

The probability that jth transmission occurs is equal to the probability that the previous transmission was unsuccessful. In order to minimize the expected utilized channel uses in both links, the following optimization should be considered:

$$\operatorname{argmin}_{\vec{n}_1, \vec{n}_2, m_1} \overline{N}_1(\vec{n}_1, m_1, k, y_1) + \overline{N}_2(\vec{n}_2, M-m_1, k, y_2), \qquad (10)$$

subject to:

$$1 - \{(1 - E(\sum_{i=1}^{m_1} n_{1,i}, k, y_1))(1 - E(\sum_{i=1}^{M-m_1} n_{2,i}, k, y_2))\} \leq \epsilon. \qquad (7)$$

Figure 4:
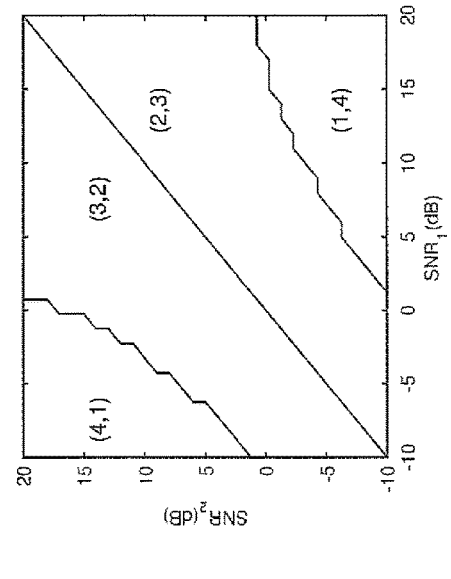
FIG. 4, including FIGS. 4(a), 4(b), 4(c), and 4(d), includes graphs illustrating optimal distribution of transmission attempts for HARQ (k=100), where
Figure 4:
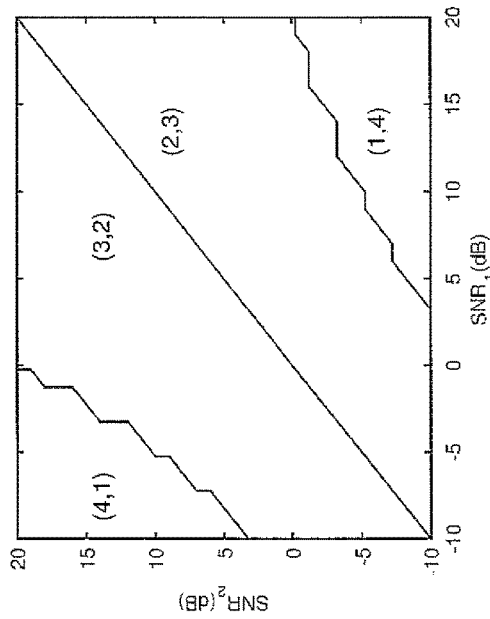
Figure 4:
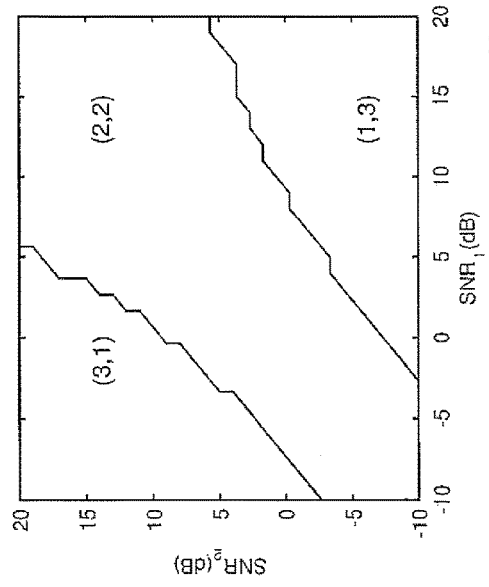
Figure 4:
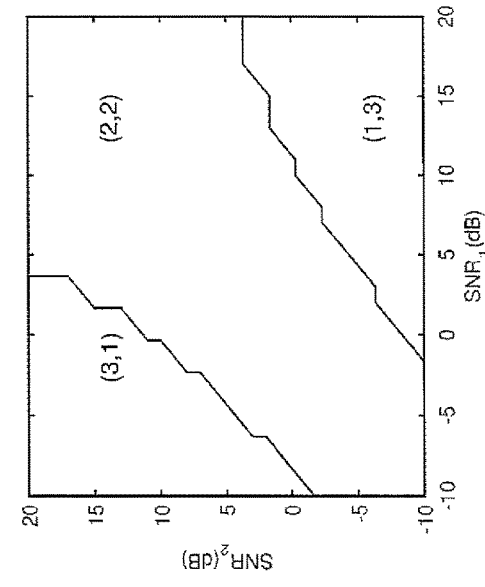

FIG. 4, including FIGS. 4(a), 4(b), 4(c), and 4(d), includes graphs illustrating optimal distribution of transmission attempts for HARQ (k=100), where FIG. 4(a) is for M=4 and $\epsilon=10^{-5}$, FIG. 4(b) is for M=5 and $\epsilon=10^{-5}$, FIG. 4(c) is for M=4 and $\epsilon=10^{-10}$, and FIG. 4(d) is for M=5 and $\epsilon=10^{-10}$. FIG. 4 shows the efficient allocation of transmission attempts between two links. It is evident that unequal transmission attempt allocation happens when the difference between SINR levels is higher compared to the ARQ case.

Adaptive transmission allocation is now described. In some embodiments, like in embodiments previously described, the proper transmission allocation for two links is determined according to the link quality. In some embodiments, once transmission starts, these allocations cannot be changed without bringing additional latency or degrading reliability performance. In the following, some embodiments of an adaptive resource allocation for transmission attempts is described. As transmissions over link 111-1 and link 111-2 occur after each other, the transmission allocation for the link 111-2 can be determined after completing the data transmission over the link 111-1.

First consider the ARQ scheme for data transmissions, where it is also assumed that in total M transmission attempts can be performed over two links 111-1 and 111-2 based on the latency requirements. The channel uses for the link 111-1 at each transmission round is fixed and data transmission can continue up to M−1 rounds. When the base station (e.g., eNB 170) receives data successfully, the remaining transmission attempts are allocated for the link 111-2 and proper channel uses are determined accordingly. Hence, the number of transmission attempts for both links may vary from 1 to M−1. Denoting the channel uses for link 111-1 by $n_1$ and for link 111-2 by $n_{2,1}, n_{2,2}, \ldots, n_{2,M-1}$, where $n_{2,j}$ represents the channel uses for the link 111-2 when j transmission attempts are left for this link. In some embodiments, in order to minimize the expected channel uses over both links, the following optimization can be considered:

$$\operatorname{argmin}_{n_1, n_{2,1}, n_{2,2}, \ldots, n_{2,M-1}} \sum_{i=1}^{M-1} E(n_1, i, k, y_1)^{i-1} \{ \overline{N}(n_1, i, k, y_1) + \overline{N}_2(n_{2,M-i}, M-i, k, y_2) \},$$

subject to:

$$1 - \{\sum_{i=1}^{M} E^{i-1}(n1, k, y_1)(1 - E(n1, k, y_1))(1 - E^{M-i}(n_{2,M-i}, k, y_2))\} \leq \epsilon. \qquad (8)$$

In some embodiments, we can utilize this method for HARQ scheme as well. Again, the transmission rounds for both links may vary from 1 up to M−1. For link 111-1, we define $\vec{n}_1 = \{n_{1,1}, n_{1,2}, \ldots, n_{1,M-1}\}$ where element $n_{1,j}$ represents the channel uses in jth round. For link 111-2, the HARQ scheme should be determined according to the remaining time budget in terms of, for example, Transmission Time Interval (TTI). We define $\vec{n}_2^1, \vec{n}_2^2, \ldots, \vec{n}_2^{M-1}$ where $\vec{n}_2^j = \{n_{2,1}^j, n_{2,2}^j, \ldots, n_{2,j}^j\}$ where represents the channel uses at each round when j HARQ rounds are allowed for the link 111-2. The optimization for minimizing the channel uses can be expressed as:

$$\operatorname{argmin}_{\vec{n}_1, \vec{n}_2^1, \vec{n}_2^2, \ldots, \vec{n}_2^{M-1}} \sum_{j=1}^{M-1} E\left(\sum_{l=0}^{j} n_{1,l}, k, \gamma_1\right) \qquad (9)$$

$$\{n_{1,l} + \overline{N}_2(\vec{n}_2^{M-l}, M-i, k, \gamma_2)\}.$$

In some embodiments, the base station (e.g., eNB 170) can receive CSI for both links 111 before data transmissions, and determine the proper MCS for the link 111-1 firstly. The base station can dynamically allocate resources for the link 111-1 until the data is received properly. Then, the base station can choose appropriate MCS for the device 2 (UE 110-2) according to the remaining delay budget and link quality. If just one TTI is remaining for link 111-2, a very robust MCS with low rate should be selected. On the other hand, if the message can be delivered using couple of TTIs, the base station (e.g., eNB 170) can choose an MCS with a higher rate, resulting in higher spectral efficiency.

Figure 5:
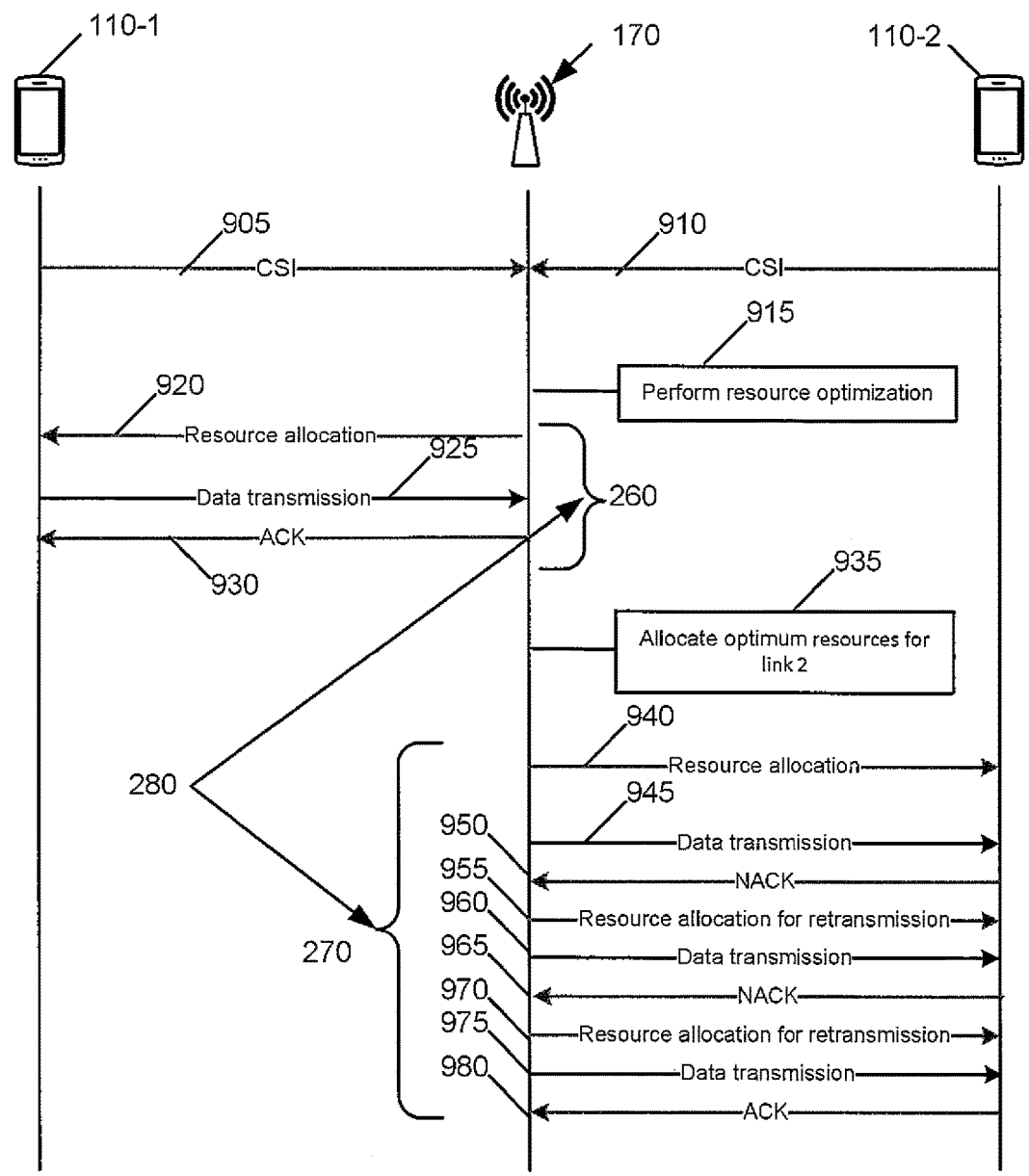
FIG. 5 is a signaling example for performing adaptive resource allocation in an example.

FIG. 5 represents an example of the signaling procedure for the proposed adaptive resource allocation. It assumed that the data is delivered to the base station in the initial transmission (e.g. due to the good channel condition), and three transmissions can be carried over link 111-2 due to the possible failure. In FIG. 5, the UEs 110-1 and 110-2 send CSI (or any other parameter illustrating channel properties of the communication link) to the eNB 170 in steps 905 and 910, respectively. The eNB 170 in block 915 performs resource optimization. This resource optimization may also include determining the MCS for the uplink (link 111-1). The eNB 170 in step 920 signals resource allocation (e.g., PRBs and the MCS) to the UE 110-1. The UE 110-1 performs data transmission in step 925 and the eNB 170 sends a positive acknowledgement (e.g. ACK) in step 930. The steps 920, 925, and 930 form an uplink part 260 of the P2P transmission 280.

In block 935, the eNB 170 performs resource optimization for the downlink (link 2, 111-2). Blocks 915 and 935 together correspond to the ARQ technique described above, e.g., in equation (8) (or the HARQ technique described above, e.g., in equation (9) above). In an example, in block 915, possible conditions are considered for resource allocation in uplink and downlink (e.g., possible conditions means different performed transmissions in uplink). The resource allocation in downlink depends on the remaining transmissions for it. So, based on the derived resource optimization in 915 and knowing how many transmissions are left, the eNB 170 performs the resource allocation in block 935. The eNB 170 signals resource allocation to the UE 110-2 in step 940 and performs data transmission to UE 110-2 in step 945. The UE 110-2 sends a negative acknowledgement (e.g. NACK) in step 950. The eNB 170 signals another resource allocation (this time for the retransmission) in step 955 and performs a second transmission of the data in step 960. The UE 110-2 sends another NACK in step 965. The eNB 170 signals another resource allocation (again, for a retransmission) in step 970 and performs a third transmission of the data in step 975. In step 980, the UE 110-2 responds with an ACK. The steps 940-980 form a downlink part 270 of the P2P transmission 280.

Note that blocks 915, 935 and the steps herein may also illustrate the operation of an example embodiment of the method, a result of execution of computer program instructions embodied on a computer readable memory, functions performed by logic implemented in hardware, and/or interconnected means for performing functions in accordance with exemplary embodiments. Also, the eNB 170 would perform the steps in FIG. 5 under control in part by its corresponding ATBA module 150.

Figure 6:
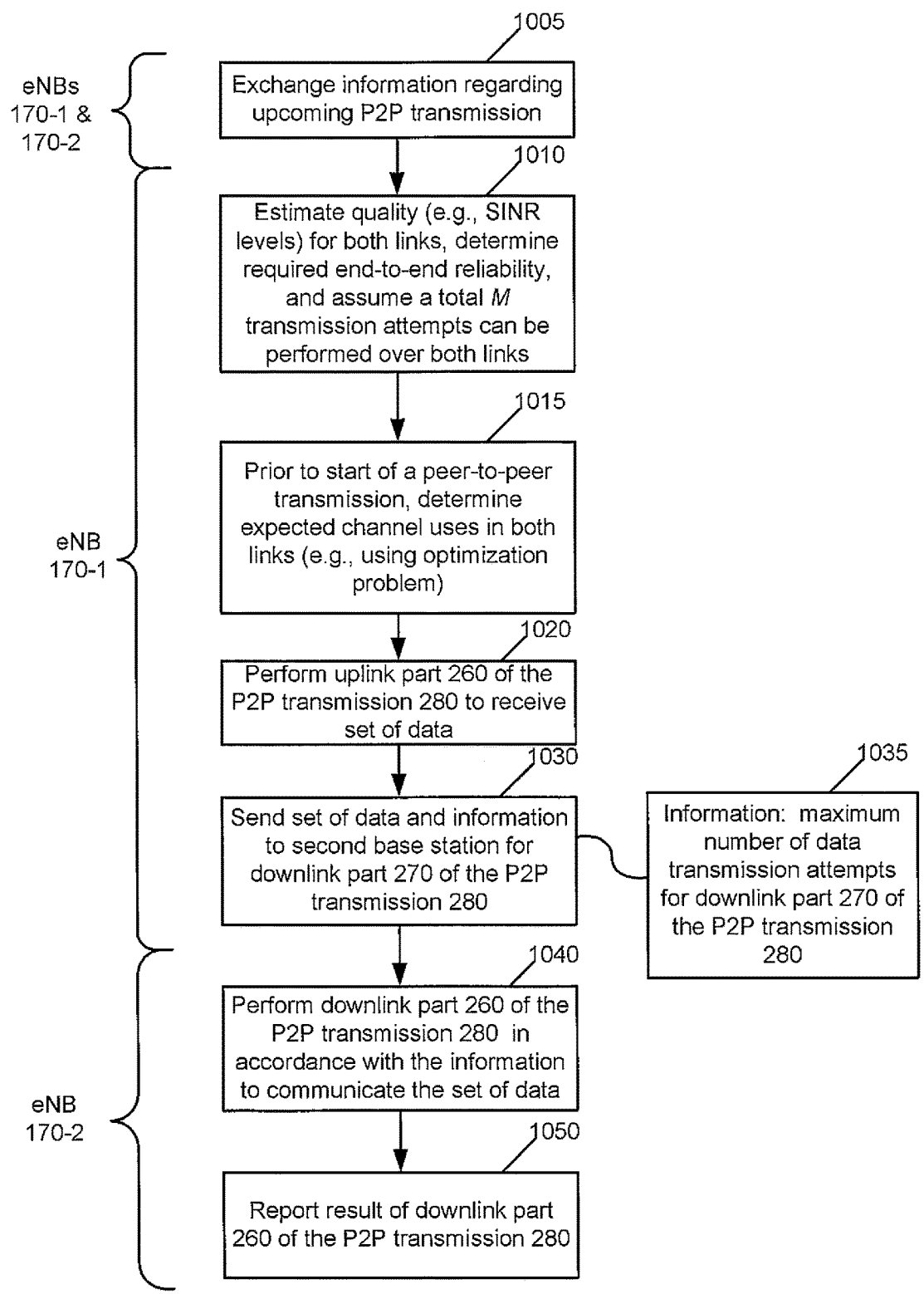
FIG. 6 is a logic flow diagram for fixed allocation attempts for a multi-hop scenario and for a fixed transmission allocation, and illustrates the operation of an exemplary method, a result of execution of computer program instructions embodied on a computer readable memory, functions performed by logic implemented in hardware, and/or interconnected means for performing functions in accordance with some examples of embodiments.
Figure 7A:
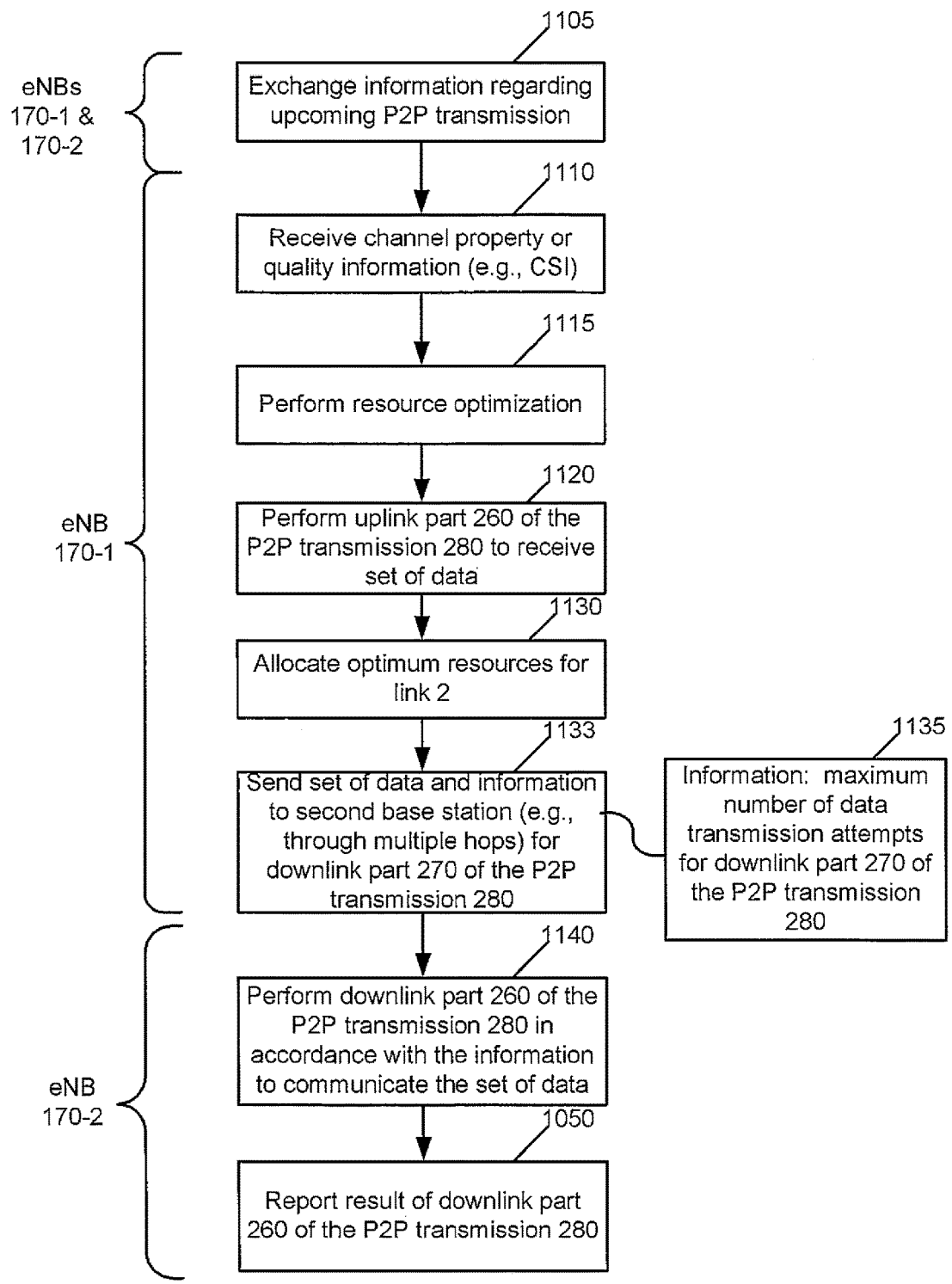
FIGS. 7A and 7B are logic flow diagrams for allocation of transmission attempts for a multi-hop scenario and for an adaptive transmission allocation, and illustrate the operation of an example method, a result of execution of computer program instructions embodied on a computer readable memory, functions performed by logic implemented in hardware, and/or interconnected means for performing functions in accordance with some examples of embodiments.
Figure 7B:
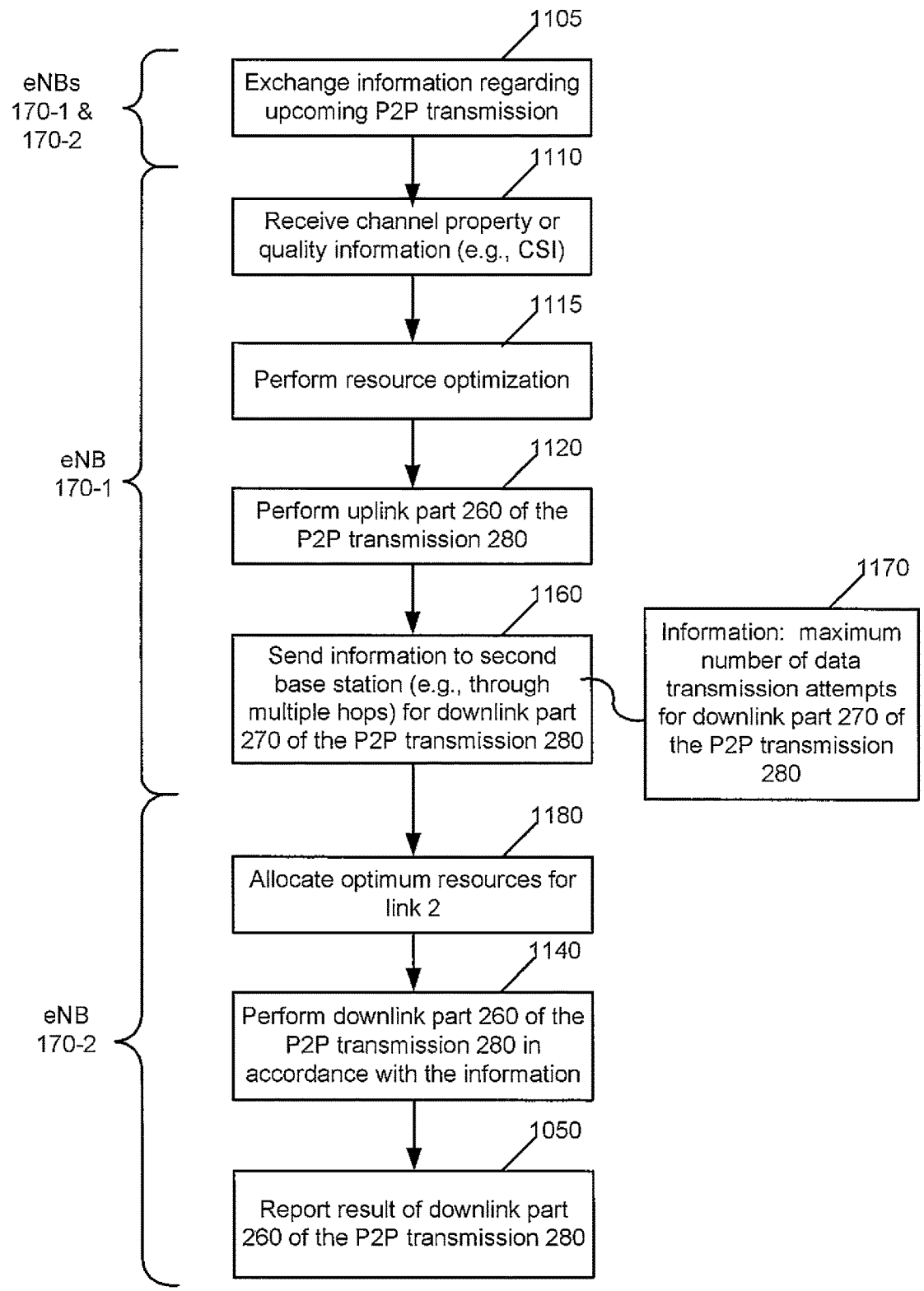

FIGS. 6, 7A, and 7B address examples for the multi-hop scenario, e.g., as illustrated by FIG. 1B also. FIG. 6 is for a fixed allocation and FIGS. 7A and 7B are for an adaptive allocation.

FIG. 6 is a logic flow diagram for fixed allocation of transmission attempts for a multi-hop scenario and for a fixed transmission allocation as described above. This figure further illustrates the operation of an example embodiment of an method, a result of execution of computer program instructions embodied on a computer readable memory, functions performed by logic implemented in hardware, and/or interconnected means for performing functions in accordance with some exemplary embodiments. For instance, the ATBA module 150 may include multiples ones of the blocks in FIG. 6, where each included block is an interconnected means for performing the function in the block. The blocks in FIG. 6 are assumed to be performed by base stations such as eNBs 170-1 and 170-2, e.g., under control at least in part of their corresponding ATBA modules 150.

In some embodiments, the eNB 170-1 performs blocks 1010, 1015, 1020, 1030, and 1035, while blocks 1040 and 1050 are performed by eNB 170-2. For a multi-hop scenario, there also should be some exchange of information (block 1005) between the two eNBs 170-1 and 170-2. For instance, the eNB 170-1 should have information from eNB 170-2, since the DL channel condition is only known at eNB 170-2 in case of multi-hop. In the example of FIG. 6, therefore, the eNBs 170-1 and 170-2 exchange information regarding upcoming P2P transmission. This exchange can include DL channel condition information at the eNB 170-2, for instance. In addition, other UE context information, for example the UE capability, MIMO configuration, UE category, and the like, could be exchanged as well. It is further noted that blocks 1005 and 1030 are considered separately in the example of FIG. 6 but these could be combined into one exchange if desired.

In block 1010, one or more network nodes (e.g., eNB(s)) estimate quality (such as SINR levels) for both links 111-1 and 111-2, determines required end-to-end reliability, and assumes a total M transmission attempts can be performed over both links 111. In block 1015, the eNB 170-1 determines, prior to the start of a peer-to-peer transmission, expected channel uses in both links. In block 1020, the eNB 170-1 performs the uplink part 260 of the P2P transmission 280 to receive a set of data from the UE 110-1. The eNB 170-1 in block 1030 performs sending the set of data and information to the second base station (i.e., eNB 170-2 in this example) for downlink part 270 of the P2P transmission 280. The information may include (block 1035) the maximum number of data transmission attempts (e.g., which defines a time budget) for the downlink part 270 of the P2P transmission 280. Recommend MCS may also be sent. The most important information is the time budget for the DL transmission at eNB 170-2, but other information may be exchanged. Note that the eNB 170-2 is supposed to use the maximum number of expected data transmission attempts (i.e., and not change the number of expected data transmission attempts). Note also that the eNB 170-2 may use less than the maximum number of expected data transmission attempts, e.g., if the UE 110-2 receives the data and sends an ACK in response to receiving the data.

In block 1040, the eNB 170-2 performs the downlink part 270 of the P2P transmission 280 in accordance with the information to communicate the set of data to the UE 110-2. In block 1050, the eNB 170-2 may also report the result of downlink part 270 of the P2P transmission 280 to the eNB 170-1. For instance this report could include whether the downlink completed or did not complete (within the required number of attempts), and/or an ACK reported to the original transmitter (e.g., which might not be reported on the radio layer).

FIGS. 7A and 7B are logic flow diagrams for adaptive time budget allocation for a multi-hop scenario and for an adaptive transmission allocation, and illustrate the operation of an example embodiment of an method, a result of execution of computer program instructions embodied on a computer readable memory, functions performed by logic implemented in hardware, and/or interconnected means for performing functions in accordance with exemplary embodiments. For instance, the ATBA module 150 may include multiples ones of the blocks in FIG. 7A or 7B, where each included block is an interconnected means for performing the function in the block. The blocks in FIG. 7A or 7B are assumed to be performed by base stations such as eNBs 170-1 and 170-2, e.g., under control at least in part of their corresponding ATBA modules 150. FIG. 7A is applicable to both the fixed and adaptive resource allocation schemes described above.

FIG. 7A describes a scenario where the eNB 170-1 performs allocating optimum resources for link 2, 111-2. Meanwhile, FIG. 7B describes a scenario where the eNB 170-2 performs allocating optimum resources for link 2, 111-2.

In some embodiments such as in FIG. 7A, the eNB 170-1 performs blocks 1110, 1115, 1120, 1130, 1133, and 1135, while blocks 1140 and 1150 are performed by eNB 170-2. Additionally, as descried above, for a multi-hop scenario, there should be some exchange of information between the two eNBs 170-1 and 170-2. For instance, the eNB 170-1 should have information from eNB 170-2, since the DL channel condition is only known at eNB 170-2 in case of multi-hop. In the example of FIG. 6, therefore, the eNBs 170-1 and 170-2 exchange information (block 1105) regarding upcoming P2P transmission. This exchange can include DL channel condition information at the eNB 170-2, for instance.

In block 1110, the eNB 170-1 receives channel property or quality information (e.g. CSI) (e.g., from UE 110-1 via signaling and also from UE 110-2 via the information exchange in block 1105). The eNB 170-1 performs resource optimization in block 1115. In block 1120, the eNB 170-1 performs the uplink part 260 of the P2P transmission 280. The eNB 170-1 in block 1130 performs block 935 of FIG. 5, which means the eNB 170-1 performs resource optimization for downlink, i.e., link 2, 111-2, based in part on what has happened during the uplink part 260. In block 1133, the eNB 170-1 performs sending the set of data and information (block 1135) to the second base station (i.e., eNB 170-2 in this example) for downlink part 270 of the P2P transmission 280. Note that this sending may occur through multiple hops, such as through multiple additional eNBs 170. The information may include (block 1135) the expected data transmission attempts for the downlink part 270 of the P2P transmission 280.

In block 1140, the eNB 170-2 performs the downlink part 270 of the P2P transmission 280 in accordance with the information to communicate the set of data to the UE 110-2. Note that the eNB 170-2 is supposed to use the maximum number of data transmission attempts (i.e., and not change the number of expected data transmission attempts). In block 1150, the eNB 170-2 may also report the result of downlink part 270 of the P2P transmission 280 to the eNB 170-1.

In some embodiments such as in FIG. 7B, the eNB 170-1 performs blocks 1110, 1115, 1120, 1160, and 1170, while blocks 1180, 1140, and 1150 are performed by eNB 170-2. Most of these blocks have been previously described in reference to FIG. 7A, so only certain blocks are described now. Since the eNB 170-2 is going to perform the allocation of resources for link 2, 111-2, the eNB 170-1 sends information (block 1160) to the second base station (eNB 170-2 in this case) for the downlink part 270 of the P2P transmission 280. This information may pass through multiple hops (e.g., via multiple eNBs 170). The information may include the expected data transmission attempts for downlink part 270 of the P2P transmission 280. In block 1130, the eNB 170-2 allocates the optimum resources for link 2, 111-2 using at least the information that is provided by eNB 170-1. In the end, it is the second eNB 170-2 which decides the actual data transmission attempts (for both FIGS. 7A and 7B). As mentioned, the information from the first eNB 170-1 to the second eNB 170-2 is the maximum number of "expected" data transmission attempts, and the "expected" number can be different when compared to the final number of transmission attempts. Additionally, for the allocation in block 1180, the optimal resource allocation for downlink is already calculated in block 1115, so this information can be sent to eNB 170-2 to prevent additional computation. So, in block 1180, the proper resource allocation is selected by the second eNB 170-2 according to the remaining transmission attempts for downlink. In block 1115, it is possible for include both UL and DL resource allocation and send at least the DL (or both UL and DL information) to the eNB 170-2. In block 1180, the eNB 170-2 can verify the value is still valid or not. If not, the DL resource allocation can be updated as well.

Figures 8, 9:
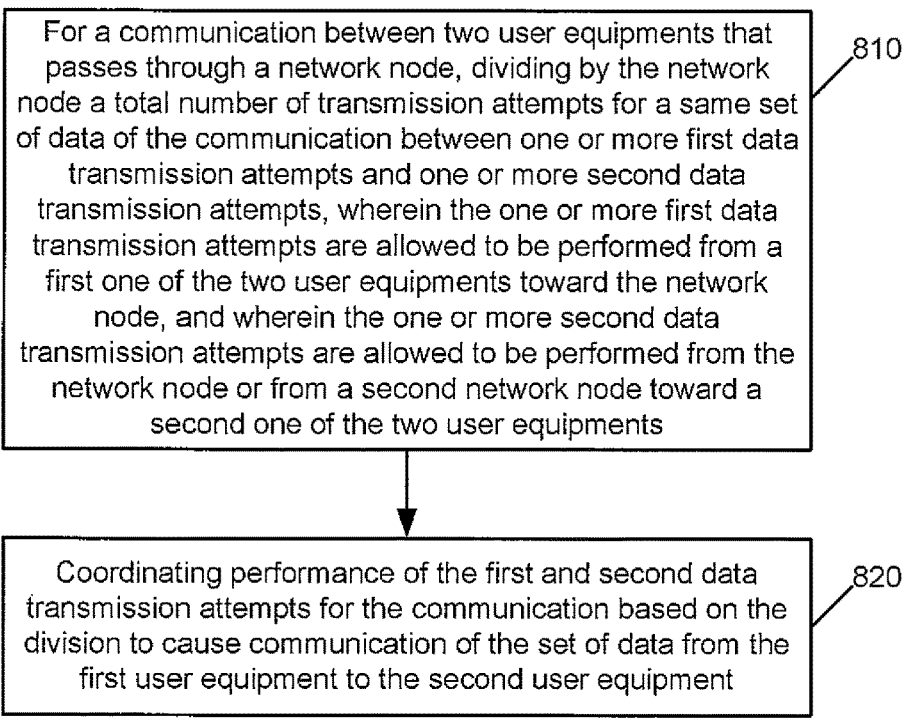
FIG. 8 is a logic flow diagram for allocation of transmission attempts in some embodiments, and illustrates the operation of an exemplary method, a result of execution of computer program instructions embodied on a computer readable memory, functions performed by logic implemented in hardware, and/or interconnected means for performing functions in accordance with some examples of embodiments.
FIG. 9 is a logic flow diagram for allocation of transmission attempts in some embodiments, and illustrates the operation of an exemplary method, a result of execution of computer program instructions embodied on a computer readable memory, functions performed by logic implemented in hardware, and/or interconnected means for performing functions in accordance with some examples of embodiments.

Turning to FIG. 8, this figure is a logic flow diagram for allocation of transmission attempts in some embodiments. This figure illustrates the operation of an exemplary method, a result of execution of computer program instructions embodied on a computer readable memory, functions performed by logic implemented in hardware, and/or interconnected means for performing functions in accordance with some examples of embodiments. The blocks in FIG. 8 are assumed to be performed by a network node and in particular abase station such as eNB 170-1, e.g., under the control in part of the ATBA module 150.

In block 810, the network node, for a communication between two user equipments that passes through a network node, performs dividing by the network node a total number of transmission attempts for a same set of data of the communication between one or more first data transmission attempts and one or more second data transmission attempts. The one or more first data transmission attempts are allowed to be performed from a first one of the two user equipments toward the network node, and the one or more second data transmission attempts are allowed to be performed from the network node or from a second network node toward a second one of the two user equipments. In block 820, the network node performs coordinating performance of the first and second data transmission attempts for the communication based on the division to cause communication of the set of data from the first user equipment to the second user equipment. For instance, the coordinating for the first data transmission attempts could be coordinating between the base station (e.g., eNB 170) and the UE 110-1 to receive the set of data (see, e.g., FIGS. 2B and 5). The coordinating for the second data transmission attempts could be coordinating between the base station (e.g., eNB 170) and the UE 110-2 to transmit the set of data to UE 110-2 (see, e.g., FIG. 2B) or could be coordinating between the base station (e.g., eNB 170-1) and base station (e.g., eNB 170-2) to allow the eNB 170-2 to transmit the set of data to the UE 110-2.

The method in FIG. 8 is also called Example 1 herein. The following are additional examples.

EXAMPLE 2

The method of example 1, wherein dividing further comprises independently choosing a number of transmission attempts for each of the one or more first data transmission attempts and the one or more second data transmission attempts and wherein the chosen transmission attempts for each of the one or more first data transmission attempts and the one or more second data transmission attempts is a maximum number of data transmission attempts for the corresponding first or second data transmission attempts.

EXAMPLE 3

The method of example 1, wherein dividing further comprises determining a number of transmission attempts for the one or more second data transmission attempts after completing data transmission for the one or more first data transmission attempts from the first user equipment to the network node.

EXAMPLE 4

The method of example 3, wherein coordinating performance further comprises choosing a modulation and coding scheme for the one or more first data transmission attempts and using the chosen modulation and coding scheme for data transmission for the one or more first data transmission attempts, and choosing appropriate modulation and coding scheme for communication for the second data transmission attempts from the network node to the second user equipment according to a remaining delay budget and link quality for the one or more second data transmission attempts.

EXAMPLE 5

The method of example 1, wherein the communication occurs using a single network node for both the one or more first data transmission attempts and the one or more second data transmission attempts, and wherein coordinating performance of the first and second data transmission attempts for the communication based on the division further comprises the single network node allocating resources for the first and second data transmission attempts and performing the communication between the two user equipments based on the allocated resources for the first and second data transmission attempts.

EXAMPLE 6

The method of example 1, wherein: the network node is a first network node; the dividing results in a first number to be used for the one or more first data transmission attempts and a second number to be used for the one or more second data transmission attempts; communication of the set of data occurs from the first user equipment to the first network node, from the first network node to the second network node, and from the second network node to the second user equipment; coordinating performance of the first and second data transmission attempts for the communication based on the division further comprises performing the one or more first data transmission attempts to receive the set of data and sending the set of data and information comprising an indication of a maximum number of data transmission attempts to be used by the second network node for the one or more second data transmission attempts from the second network node to the second user equipment.

EXAMPLE 7

The method of example 6, wherein the communication from the first network node to the second network node occurs through one or more additional network nodes.

EXAMPLE 8

The method of example 1, wherein coordinating performance of the first and second data transmission attempts for the communication based on the division further comprises communicating the set of data an information to the second network node to allow the second network node to perform the one or more second data transmission attempts from the second network node to the second user equipment based at least on a maximum number of second data transmission attempts determined by the division.

EXAMPLE 9

The method of example 6, wherein the information comprises one or more of recommended modulation and coding scheme and number of resources, to be used by the second network node to allow the second network node to perform the one or more second data transmission attempts.

EXAMPLE 10

The method of example 1, wherein: the network node is a first network node; the dividing results in a number to be used for the second data transmission attempts; the communication occurs from the first user equipment to the first network node and from a second network node to the second user equipment; and coordinating performance of the first and second data transmission attempts for the communication based on the division further comprises communicating the set of data and information to the second network node, the information comprising a maximum number of second data transmission attempts to be used by the second network node to perform the one or more second data transmission attempts from the second network node to the second user equipment.

EXAMPLE 11

The method of any of the previous examples, wherein dividing further comprises satisfying at least one of equations (1) and (2) below:

$$m_1 + m_2 \leq M, \quad (1)$$

$$1 - (1-\epsilon_1)(1-\epsilon_2) \leq \epsilon, \quad (2)$$

where a maximum transmission attempt is represented by M, a number of transmission attempts for the first data transmission attempts is represented by $m_1$, a number of transmission attempts for the second data transmission attempts is represented by $m_2$, $\epsilon$ is a block error rate, a remaining block error rate after retransmissions over the first data transmission attempts is $\epsilon_1$, and a remaining block error rate after retransmission over the second data transmission attempts is $\epsilon_2$.

EXAMPLE 12

The method of example 11, wherein an expected block error rate is expressed as:

$$E(n, k, \gamma) = Q\left(\frac{nC_1(\gamma) - k}{\sqrt{nV_1(\gamma)}}\right), \quad (3)$$

where:

$$C_1(\gamma) = \frac{1}{2}\log(\gamma),$$

$$V_1(\gamma) = \frac{\gamma}{2}\frac{\gamma+2}{(\gamma+1)^2}\log^2 e,$$

$$\log^2 e = (\log e)^2 \text{ and } Q(x) = \frac{1}{\sqrt{2\pi}}\int_x^\infty \exp\left(-\frac{u^2}{2}\right)du.$$

EXAMPLE 13

The method of example 12, wherein for link i with signal to interference noise ratio of $y_i$, a transmitter in the network node carries k bits of information using $n_i$ channel uses and the transmission attempts are limited to $m_i$ rounds, the expected channel uses is expressed as the following:

$$\overline{N}_i(n_i, m_i, k, y_i) = \sum_{j=1}^{m_i} n_i \{E(n_i, k, y_i)\}^{j-1}, \text{ and}$$

the method includes the network node solving the following:

$$\operatorname{argmin}_{n_1, n_2, m_1} \overline{N}_1(n_1, m_1, k, y_1) + \overline{N}_2(n_2, M-m_1, k, y_2),$$

Subject to:

$$1 - \{1 - \{E(n_1, k, y_1)\}^{m_1}\}\{1 - \{E(n_2, k, y_2)\}^{M-m_1}\} \leq \epsilon.$$

EXAMPLE 14

The method of example 12, wherein for link i with signal to interference noise ratio of $y_i$, a transmitter in the network node carries k bits of information using $\vec{n}_i = \{n_{i,1}, n_{i,2}, \ldots, n_{i,m_i}\}$ channel uses, which $n_{i,j}$ represents the channel uses in a jth hybrid automatic repeat request round for link i and the transmission attempts are limited to $m_i$ rounds, the expected channel uses is expressed as the following:

$$\overline{N}_i(\vec{n}_i, m_i, k, y_i) = \sum_{j=1}^{m_i-1} n_{i,j} \{E(\sum_{k=1}^{j-1} n_{i,k}, k, y_i)\}, \text{ and}$$

the method includes the network node solving the following:

$$\operatorname{argmin}_{\vec{n}_1, \vec{n}_2, m_1} \overline{N}_1(\vec{n}_1, m_1, k, y_1) + \overline{N}_2(\vec{n}_2, M-m_1, k, y_2),$$

subject to:

$$1 - \{(1 - E(\sum_{i=1}^{m_1} n_{1,i}, k, y_1))(1 - E(\sum_{i=1}^{M-m_1} n_{2,i}, k, y_2))\} \leq \epsilon.$$

Another example is an apparatus comprising: means, for a communication between two user equipments that passes through a network node, for dividing by the network node a total number of transmission attempts for a same set of data of the communication between one or more first data transmission attempts and one or more second data transmission attempts, wherein the one or more first data transmission attempts are allowed to be performed from a first one of the two user equipments toward the network node, and wherein the one or more second data transmission attempts are allowed to be performed from the network node or from a second network node toward a second one of the two user equipments; and means for coordinating performance of the first and second data transmission attempts for the communication based on the division to cause communication of the set of data from the first user equipment to the second user equipment. Another apparatus comprises means for performing the method of any of the examples 1 to 14.

Another example is a base station comprising any of the apparatus of the previous paragraph.

An exemplary apparatus includes one or more processors and one or more memories including computer program code. The one or more memories and the computer program code are configured to, with the one or more processors, cause the apparatus to perform the method of any of examples 1 to 14.

Referring to FIG. 9, which is a logic flow diagram for allocation of transmission attempts in some embodiments, this figure illustrates the operation of an exemplary method, a result of execution of computer program instructions embodied on a computer readable memory, functions performed by logic implemented in hardware, and/or interconnected means for performing functions in accordance with some examples of embodiments. The blocks in FIG. 9 are assumed to be performed by a network node such as base station such as eNB 170-2, e.g., under the control in part of the ATBA module 150.

In block 910, the network node performs receiving information from a first network node at a second network node. The received information corresponds to a communication between two user equipments that passes from a first of the two user equipments to the first network node via one or more first data transmission attempts, then to the second network node, and from the second network node to the second of the two user equipments via one or more second data transmission attempts. A total number of transmission attempts for a same set of data is divided between the one or more first data transmission attempts and the one or more second data transmission attempts. The receiving also comprises receiving the set of data. In block 920 the network node performs by the second network node the one or more second data transmission attempts of the set of data from the second network node to the second user equipment based at least on the information.

The method of FIG. 9 is referred to as example 15 herein. Additional examples are as follows.

EXAMPLE 16

The method of example 15, wherein the information comprises a maximum number of expected transmission attempts for the second data transmission attempts, and wherein the second network node performs the maximum number of expected transmission attempts for the second data transmission attempts unless an positive acknowledgement is received from the second user equipment before the maximum number of expected transmission attempts has been performed.

EXAMPLE 17

The method of example 15, wherein the information comprises a maximum number of transmission attempts for the one or more second data transmission attempts, and wherein performing further comprises allocating resources for the one or more second data transmission attempts based at least on the maximum number of transmission attempts and performing by the second network node the one or more second data transmission attempts based on the allocated resources.

EXAMPLE 18

The method of example 15, wherein the information comprises a maximum number of transmission attempts for the second data transmission attempts and resource allocation determined by the first base station for use for the second data transmission attempts, and wherein performing further comprises performing by the second network node the one or more second data transmission attempts from the second network node to the second user equipment based at least on the maximum number of transmission attempts for the second data transmission attempts and the resource allocation determined by the first base station.

A further apparatus comprises: means for receiving information from a first network node at a second network node, the received information corresponding to a communication between two user equipments that passes from a first of the two user equipments to the first network node via one or more first data transmission attempts, then to the second network node, and from the second network node to the second of the two user equipments via one or more second data transmission attempts, wherein a total number of transmission attempts for a same set of data is divided between the one or more first data transmission attempts and the one or more second data transmission attempts, and wherein the receiving also comprises receiving the set of data; and means for performing by the second network node the one or more second data transmission attempts of the set of data from the second network node to the second user equipment based at least on the information. Another apparatus comprises means for performing the method of any of the examples 15 to 18.

Another example is a base station comprising any of the apparatus of the previous paragraph.

An exemplary apparatus includes one or more processors and one or more memories including computer program code. The one or more memories and the computer program code are configured to, with the one or more processors, cause the apparatus to perform the method of any of examples 15 to 18.

An additional exemplary embodiment includes a computer program, comprising code for performing any of the methods of examples 1-18, when the computer program is run on a processor. The computer program according to this paragraph, wherein the computer program is a computer program product comprising a computer-readable medium bearing computer program code embodied therein for use with a computer.

Without in any way limiting the scope, interpretation, or application of the claims appearing below, a technical effect of one or more of the example embodiments disclosed herein is splitting a total number of data transmissions for P2P communications between two UEs. Another technical effect of one or more of the example embodiments disclosed herein is a better ability to meet stringent reliability and delay constraints for envisioned applications requiring URC for their operation. Another technical effect of one or more of the example embodiments disclosed herein is improved overall resource utilization in a peer-to-peer communication.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIGS. 1A and 1B. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
% percent
4G fourth generation
5G fifth generation
ACK (positive) acknowledgement
ARQ automatic repeat request
ATBA adaptive time budget allocation
AWGN additive white Gaussian noise
BLER block error rate
CSI channel state information
CQI channel quality information
DL downlink
eNB (or eNodeB) evolved Node B (e.g., an LTE base station)
HARQ hybrid automatic repeat request
I/F interface
LTE long term evolution
MCS modulation and coding schemes
MIMO multiple input, multiple output
MME mobility management entity
ms milliseconds
NACK negative acknowledgement
NCE network control element
network
P2P peer-to-peer
PRB physical resource block
QoS quality of service
RRH remote radio head
Rx receiver
SGW serving gateway
SINR signal to interference plus noise ratio
SNR signal to noise ratio
ITT transmission time interval
Tx transmitter
UE user equipment (e.g., a wireless, typically mobile device)
UL uplink
URC ultra-reliable communications
VoIP voice over Internet Protocol (IP)

What is claimed is:

1. A method, comprising:
for a communication between two user equipments that passes through a network node, dividing by the network node a total number of transmission attempts for a same set of data of the communication between one or more first data transmission attempts and one or more second data transmission attempts, wherein the one or more first data transmission attempts are allowed to be performed from a first one of the two user equipments toward the network node, and wherein the one or more second data transmission attempts are allowed to be performed from the network node or from a second network node toward a second one of the two user equipments; and
coordinating by the network node performance of the first and second data transmission attempts for the communication based on the division to cause communication of the set of data from the first user equipment toward the second user equipment.

2. The method of claim 1, wherein dividing farther comprises independently choosing a number of transmission attempts for each of the one or more first data transmission attempts and the one or more second data transmission attempts and wherein the chosen transmission attempts for each of the one or more first data transmission attempts and the one or more second data transmission attempts is a maximum number of data transmission attempts for the corresponding first or second data transmission attempts.

3. The method of claim 1, wherein dividing further comprises determining a number of transmission attempts for the one or more second data transmission attempts after completing data transmission for the one or more first data transmission attempts from the first user equipment to the network node.

4. The method of claim 3, wherein coordinating performance further comprises choosing a modulation and coding scheme for the one or more first data transmission attempts and using the chosen modulation and coding scheme for data transmission for the one or more first data transmission attempts, and choosing appropriate modulation and coding scheme for communication for the second data transmission attempts from the network node to the second user equipment according to a remaining delay budget and link quality for the one or more second data transmission attempts.

5. The method of claim 1, wherein the communication occurs using a single network node for both the one or more first data transmission attempts and the one or more second data transmission attempts, and wherein coordinating performance of the first and second data transmission attempts for the communication based on the division further comprises the single network node allocating resources for the first and second data transmission attempts and performing the communication between the two user equipments based on the allocated resources for the first and second data transmission attempts.

6. The method of claim 1, wherein:
the network node is a first network node;
the dividing results in a first number to be used for the one or more first data transmission attempts and a second number to be used for the one or more second data transmission attempts;
communication of the set of data occurs from the first user equipment to the first network node, from the first network node to the second network node, and from the second network node to the second user equipment;
coordinating performance by the network node of the first and second data transmission attempts for the communication based on the division further comprises performing the one or more first data transmission attempts to receive the set of data and sending by the first network node to the second network node the set of data and information comprising an indication of a maximum number of data transmission attempts to be used by the second network node for the one or more second data transmission attempts from the second network node to the second user equipment.

7. The method of claim 6, wherein the communication from the first network node to the second network node occurs through one or more additional network nodes.

8. The method of claim 6, wherein the information comprises one or more of recommended modulation and coding scheme and number of resources, to be used by the second network node to allow the second network node to perform the one or more second data transmission attempts.

9. The method of claim 1, wherein coordinating performance of the first and second data transmission attempts for the communication based on the division further comprises communicating the set of data an information to the second network node to allow the second network node to perform the one or more second data transmission attempts from the second network node to the second user equipment based at least on a maximum number of second data transmission attempts determined by the division.

10. The method of claim 1, wherein:
the network node is a first network node;
the dividing results in a number to be used for the second data transmission attempts;
the communication occurs from the first user equipment to the first network node and from a second network node to the second user equipment; and
coordinating performance of the first and second data transmission attempts for the communication based on the division further comprises communicating the set of data and information to the second network node, the information comprising a maximum number of second data transmission attempts to be used by the second network node to perform the one or more second data transmission attempts from the second network node to the second user equipment.

11. The method of claim 1, wherein dividing further comprises satisfying at least one of equations (1) and (2) below:

$$m_1 + m_2 \leq M, \quad (1)$$

$$1 - (1 - \epsilon_1)(1 - \epsilon_2) \leq \epsilon, \quad (2)$$

where a maximum transmission attempt is represented by M, a number of transmission attempts for the first data transmission attempts is represented by $m_1$, a number of transmission attempts for the second data transmission attempts is represented by $m_2$, $\epsilon$ is a block error rate, a remaining block error rate after retransmissions over the first data transmission attempts is $\epsilon_1$, and a remaining block error rate after retransmission over the second data transmission attempts is $\epsilon_2$.

12. The method of claim 11, wherein an expected block error rate is expressed as:

$$E(n, k, \gamma) = Q\left(\frac{nC_1(\gamma) - k}{\sqrt{nV_1(\gamma)}}\right), \quad (3)$$

where:

$$C_1(\gamma) = \frac{1}{2}\log(\gamma),$$

$$V_1(\gamma) = \frac{\gamma}{2}\frac{\gamma + 2}{(\gamma + 1)^2}\log^2 e,$$

$$\log^2 e = (\log e)^2 \text{ and } Q(x) = \frac{1}{\sqrt{2\pi}}\int_x^\infty \exp\left(-\frac{u^2}{2}\right)du.$$

13. The method of claim 12, wherein for link i with signal to interference noise ratio of $y_i$, a transmitter in the network node carries k bits of information using $n_i$ channel uses and the transmission attempts are limited to $m_i$ rounds, the expected channel uses is expressed as the following:

$$\overline{N}_i(n_i, m_i, k, y_i) = \Sigma_{j=1}^{m_i} n_i \{E(n_i, k, y_i)\}^{j-1}, \text{ and}$$

the method includes the network node solving the following:

$$\text{argmin}_{n_1, n_2, m_1} \overline{N}_1(n_1, k, y_1) + \overline{N}_2(n_2, M - m_1, k, y_2),$$

Subject to:

$$1 - \{1 - \{E(n_1, k, y_1)\}^{m_1}\}\{1 - \{E(n_1, k, y_2)\}^{M-m_1}\} \leq \epsilon.$$

14. The method of claim 12, wherein for link i with signal to interference noise ratio of $y_i$, a transmitter in the network node carries k bits of information using $\vec{n}_i = \{n_{i,1}, n_{i,2}, \ldots n_{i,m_i}\}$ channel uses, which $n_{i,j}$ represents the channel uses in a jth hybrid automatic repeat request round for link i and the transmission attempts are limited to $m_i$ rounds, the expected channel uses is expressed as the following:

$$\overline{N}_i(\vec{n}_{i,m_i,k,y_i}) = \Sigma_{j=1}^{m_i-1} n_{i,j} \{E(\Sigma_{k=1}^{j-1} n_{i,k}, k, y_i)\},$$

and
the method includes the network node solving the following:

$$\text{argmin}_{\vec{n}_1, \vec{n}_2, m_1} \overline{N}_1(\vec{n}_1, m_1, k, y_1) + \overline{N}_2(\vec{n}_2, M - m_1, k, y_2),$$

subject to:

$$1 - \{(1 - E(\Sigma_{i=1}^{m_1} n_{1,i}, k, y_1))(1 - E(\Sigma_{i=1}^{M-m_1} n_{2,i}, k, y_2))\} \leq \epsilon.$$

15. The method of claim 1, wherein:
the dividing places a limit of a first number of the first data transmission attempts and a limit of a second number of the second data transmission attempts in accordance with the total number of transmission attempts; and
coordinating further comprises coordinating by the network node performance of the first and second data transmission attempts for the communication based on the first number of the first data transmission attempts and based on the second number of the second data transmission attempts.

16. A method, comprising:
receiving information from a first network node at a second network node, the received information corresponding to a communication between two user equipments that passes from a first of the two user equipments to the first network node via one or more first data transmission attempts, then to the second network node, and from the second network node to the second of the two user equipments via one or more second data transmission attempts, wherein a total number of transmission attempts for a same set of data is divided between the one or more first data transmission attempts and the one or more second data transmission attempts, and wherein the receiving also comprises receiving the set of data; and
performing by the second network node the one or more second data transmission attempts of the set of data from the second network node to the second user equipment based at least on the information.

17. The method of claim 16, wherein the information comprises a maximum number of transmission attempts for the one or more second data transmission attempts, and wherein performing further comprises allocating resources for the one or more second data transmission attempts based at least on the maximum number of transmission attempts and performing by the second network node the one or more second data transmission attempts based on the allocated resources.

18. The method of claim 16, wherein the information comprises a maximum number of transmission attempts for the second data transmission attempts and resource allocation determined by the first base station for use for the second data transmission attempts, and wherein performing further comprises performing by the second network node the one or more second data transmission attempts from the second network node to the second user equipment based at least on the maximum number of transmission attempts for the second data transmission attempts and the resource allocation determined by the first base station.

19. The method of claim 16, wherein the information comprises a maximum number of expected transmission attempts for the second data transmission attempts, and wherein the second network node performs the maximum number of expected transmission attempts for the second data transmission attempts unless a positive acknowledgement is received from the second user equipment before the maximum number of expected transmission attempts has been performed.

20. An apparatus, comprising:
at least one processor; and
at least one memory including computer program code,
the at least one memory and the computer program code configured, with the at least one processor, to cause the apparatus to perform at least the following:
for a communication between two user equipments that passes through a network node, dividing by the network node a total number of transmission attempts for a same set of data of the communication between one or more first data transmission attempts and one or more second data transmission attempts, wherein the one or more first data transmission attempts are allowed to be performed from a first one of the two user equipments toward the network node, and wherein the one or more second data transmission attempts are allowed to be performed from the network node or from a second network node toward a second one of the two user equipments; and
coordinating by the network node performance of the first and second data transmission attempts for the communication based on the division to cause communication of the set of data from the first user equipment toward the second user equipment.

* * * * *

UNITED STATES PATENT AND TRADEMARK OFFICE
CERTIFICATE OF CORRECTION

PATENT NO. : 10,148,747 B2
APPLICATION NO. : 14/978454
DATED : December 4, 2018
INVENTOR(S) : Zexian Li et al.

It is certified that error appears in the above-identified patent and that said Letters Patent is hereby corrected as shown below:

In the Claims

In Claim 1:
Column 22, Line 39, "farther" should be deleted and --further-- should be inserted.

In Claim 13:
Column 24, Line 32, "$\overline{N}_i(n_i,m_i,k,y_i) = \Sigma_{j=1}^{m_i} n_i \{E(n_i,k,y_i)\}^{j-1}$, and" should be deleted and --$\overline{N}_i(n_i, m_i, k, \gamma_i) = \sum_{j=1}^{m_i} n_i \{E(n_i, k, \gamma_i)\}^{j-1}$, and-- should be inserted.

In Claim 13:
Column 24, Line 36, "$\text{argmin}_{n_1,n_2,m_1} \overline{N}_1(n_1,k,y_1) + \overline{N}_2(n_2,M-m_1,k,y_2)$," should be deleted and --$argmin_{n_1, n_2, m_1} \overline{N}_1(n_1, m_1, k, \gamma_1) + \overline{N}_2(n_2, M - m_1, k, \gamma_2)$,-- should be inserted.

In Claim 13:
Column 24, Line 40, "$1-\{1-\{E(n_1,k,y_1)\}^{m_1}\}\{1-\{E(n_1,k,y_2)\}^{M-m_1}\} \leq \epsilon$." should be deleted and --$1 - \{1 - \{E(n_1, k, \gamma_1)\}^{m_1}\}\{1 - \{E(n_2, k, \gamma_2)\}^{M-m_1}\} \leq \epsilon$-- should be inserted.

Signed and Sealed this
Twelfth Day of February, 2019

Andrei Iancu
*Director of the United States Patent and Trademark Office*

CERTIFICATE OF CORRECTION (continued)
U.S. Pat. No. 10,148,747 B2

In Claim 2:

Column 24, Line 50, " $N_i(\vec{n}_{i,mi,k,yi}) = \Sigma_{j=1}^{m_i-1} n_{i,j} \{E(\Sigma_{k=1}^{j-1} n_{i,k}, k, y_i)\},$ " should be deleted and -- $\overline{N}_i(\vec{n_i}, m_i, k, \gamma_i) = \sum_{j=1}^{m_i-1} n_{i,j} \{E(\sum_{k=1}^{j-1} n_{i,k}, k, \gamma_i)\}$ -- should be inserted.

In Claim 14:

Column 24, Line 59, " $1 - \{(1 - E(\Sigma_{i=1}^{m1} n_{1,i}, k, y_1))(1 - E(\Sigma_{i=1}^{M-m1} n_{2,i}, k, y_2))\} \leq \epsilon.$ " should be deleted and -- $1 - \left\{\left(1 - E\left(\sum_{i=1}^{m_1} n_{1,i}, k, \gamma_1\right)\right)\left(1 - E\left(\sum_{i=1}^{M-m_1} n_{2,i}, k, \gamma_2\right)\right)\right\}$ -- should be inserted.